(12) United States Patent
Ginter et al.

(10) Patent No.: US 7,318,449 B2
(45) Date of Patent: Jan. 15, 2008

(54) MIXER CARTRIDGE

(75) Inventors: Andreas Ginter, Schramberg-Heiligenbronn (DE); Joachim Blattner, Haslach (DE); Juergen King, Lauterbach (DE)

(73) Assignee: Hansgrohe AG, Schiltach (DE)

( * ) Notice: Subject to any disclaimer, the term of this patent is extended or adjusted under 35 U.S.C. 154(b) by 96 days.

(21) Appl. No.: 11/321,416

(22) Filed: Dec. 29, 2005

(65) Prior Publication Data
US 2006/0157126 A1    Jul. 20, 2006

(30) Foreign Application Priority Data
Jan. 4, 2005    (DE)    ............ 10 2005 001 300

(51) Int. Cl.
*F16K 11/074*    (2006.01)
(52) U.S. Cl. .................. 137/625.4; 137/636.3; 251/288
(58) Field of Classification Search ......... 137/625.17, 137/625.4, 625.41, 636.2, 636.3; 251/285, 251/288
See application file for complete search history.

(56) References Cited

U.S. PATENT DOCUMENTS

| | | | |
|---|---|---|---|
| 3,056,418 A * | 10/1962 | Adams et al. | 137/625.41 |
| 3,915,195 A * | 10/1975 | Manoogian et al. | 137/625.41 |
| 4,043,359 A * | 8/1977 | Christo | 137/625.41 |
| 4,375,225 A * | 3/1983 | Andersson | 137/625.17 |
| 4,449,551 A * | 5/1984 | Lorch | 137/625.41 |
| 4,502,507 A | 3/1985 | Hayman | |
| 4,768,552 A | 9/1988 | Stella | |
| 4,971,113 A * | 11/1990 | Pawelzik et al. | 137/625.17 |
| 5,490,540 A * | 2/1996 | Vom Dahl et al. | 137/625.17 |
| 6,019,132 A | 2/2000 | Knapp | |
| 6,363,969 B1 | 4/2002 | Schneider | |

FOREIGN PATENT DOCUMENTS

| | | |
|---|---|---|
| DE | 79 04 780 U1 | 3/1980 |
| DE | 30 41 696 A1 | 6/1982 |
| DE | 40 38 474 A1 | 7/1991 |
| WO | WO 01/77566 A1 | 10/2001 |

OTHER PUBLICATIONS

DE Search Report (Recherchebericht).
European Search Report; May 10, 2006.

* cited by examiner

*Primary Examiner*—John Rivell
(74) *Attorney, Agent, or Firm*—Duane Morris LLP

(57) ABSTRACT

A mixer cartridge contains a plate-type control system, the control plate of which is displaceable and twistable by an actuating element configured as a double-armed lever. The displacement leads to an opening and closing of the valve, while the twisting serves to alter the temperature. According to the invention, it is envisioned that the maximum opening and closing position of a holding plate controlling the movable control plate is limited by stops. For the actuating element, a stop is also provided, which acts in the same way, yet is arranged such that it still has a minimum distance from the actuating element when the holding plate is already bearing against the stop.

10 Claims, 1 Drawing Sheet

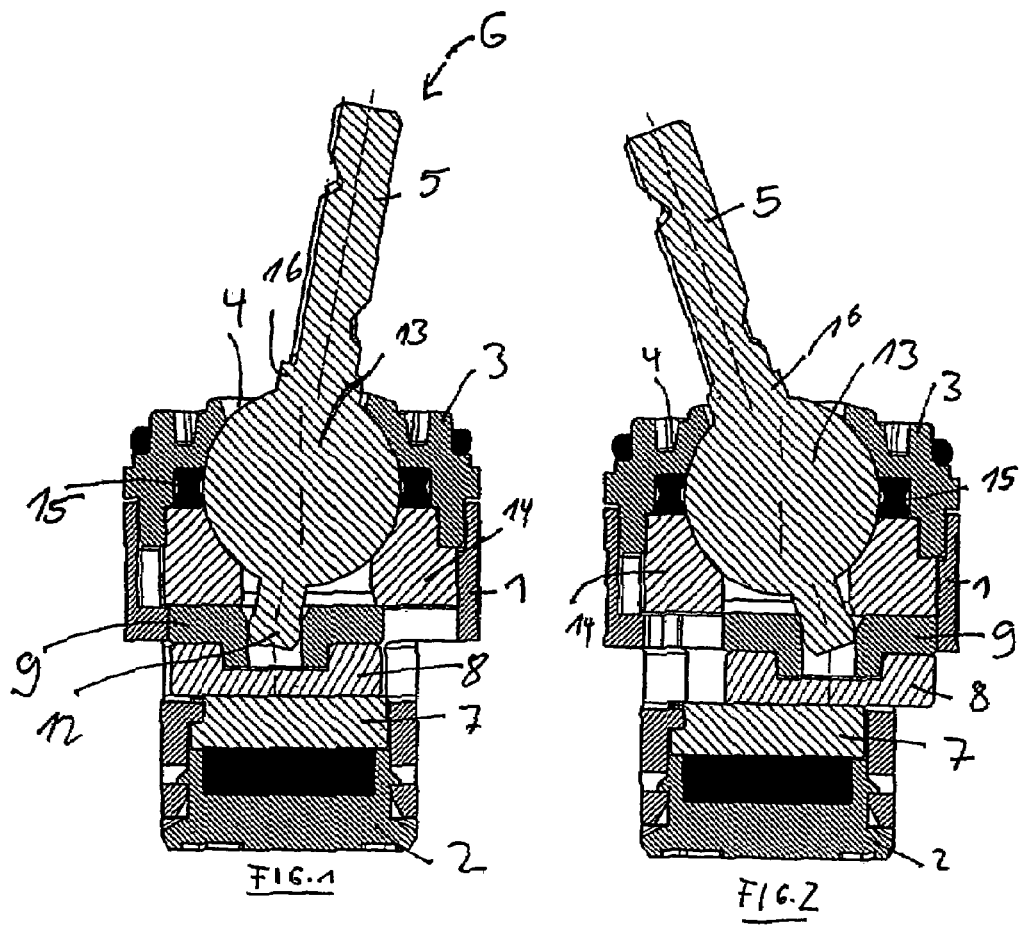
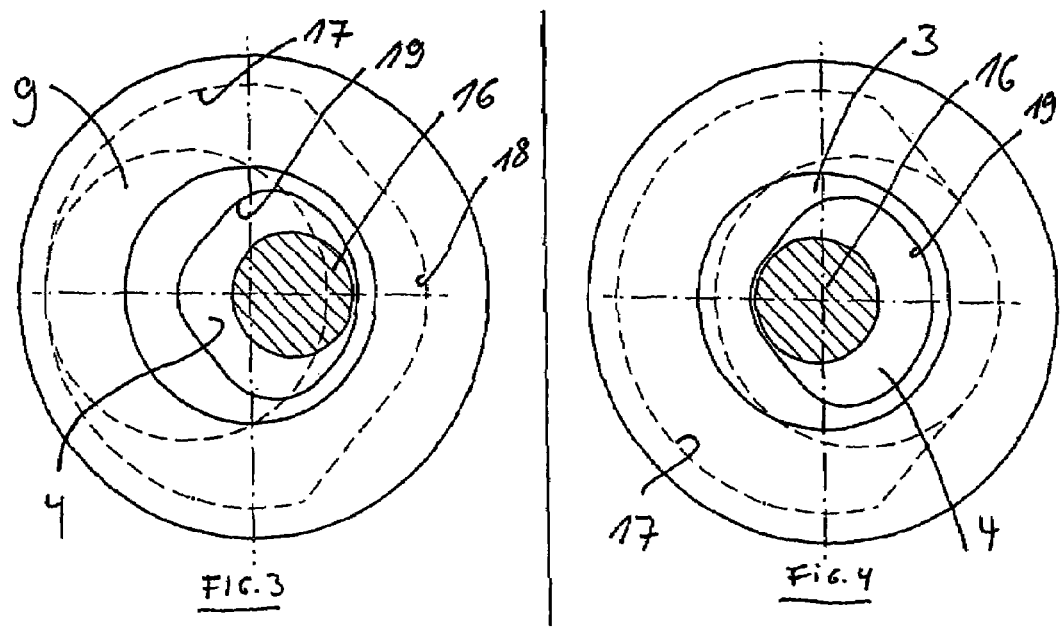

MIXER CARTRIDGE

BACKGROUND OF THE INVENTION

1. Field

The invention relates to a mixer cartridge.

2. Prior art

In sanitary fittings, use is often made of mixer cartridges containing a full mixer control system, generally employing ceramic control plates. The use of mixer cartridges has the advantage that exchangeable mixer elements can be used with different-shaped fitting housings.

Since the fitting housings are often subject to the wish to have the smallest possible structure, the mixer cartridges, too, are becoming increasingly small. However, while the use of sanitary fittings by the user remains unchanged, the fittings are treated without regard to their size. This gives rise to the requirement that mixer cartridges, too, should be able to tolerate careless treatment.

SUMMARY

An object of the invention is to provide a mixer cartridge which better withstands careless treatment.

In order to achieve this object, the invention proposes a mixer cartridge having the features disclosed and claimed herein.

The mixer cartridges are operated with actuating elements to which a handle is attached. This handle has sometimes, for its part, a lever, with the result that, upon the pivot motion which is customary for opening and closing purposes, large forces can be exerted upon the mixer cartridge. Specifically when a valve is closed, large forces are often exerted upon the mixer system, since the closure of the valve generally occurs rapidly. There is therefore the danger that, as the mixer cartridges become increasingly small, a leak occurs when constantly jerky motions are applied to the inner side of the cartridge housing. Through the fitting of a second stop, which is configured to act upon the actuating element, these forces are better absorbed.

Usually the actuating shaft, which is mounted in the mixer cartridge, is configured as a double-armed lever. The mounting is realized, for example, in a type of spherical cap, the arm jutting inside the cartridge being operatively connected to the control plate of the plate-type control system, whereas, to the arm jutting out of the cartridge, the fitting handle is attached. The stop for acting upon the actuating element can act, for example within the cartridge, on the inwardly directed lever arm. It is particularly favorable, however, if the stop is configured to act upon that lever arm of the actuating element which is facing away from the control plate.

The movable control plate is usually configured as, for example, a circular disk. This derives from the fact that it is not only displaced, but is also twisted. The invention now proposes in a refinement that the stop for the control plate is configured on a contour of the cartridge housing which surrounds the control plate, the contour being shaped, in particular, such that it encloses the maximum possible motional path of the control plate. It thereby becomes possible to form a stop not only for the valve-closing process but also for all other states of the valve, in particular also the opening process.

In order further to improve the stability of the mixer cartridge, it can likewise be envisioned that the stop for the actuating element is configured on a contour of the cartridge housing which surrounds the maximum possible motional path of the actuating element, this contour, here too, being shaped such that a stop can be obtained in all possible positions.

It can particularly be envisioned that the contour for the actuating element is configured as a reduced mirror image of the contour for the control plate.

BRIEF DESCRIPTION OF THE DRAWINGS

Further features, details and preferences of the invention emerge from the claims and the abstract, both of whose wording is formulated by reference to the content of the description, the following description of a preferred embodiment of the invention and with reference to the drawing, in which:

FIG. 1 shows a longitudinal section through a mixer cartridge in the open state of the cartridge;

FIG. 2 shows a representation corresponding to FIG. 1, with the cartridge in the closed state;

FIG. 3 shows a section through the actuating element, with the schematic representation of the position of the control plate in the position of FIG. 1;

FIG. 4 shows a section, corresponding to FIG. 3, through the mixer cartridge in the position of FIG. 2.

DETAILED DESCRIPTION

To begin with, the structure of the represented mixer cartridge is described with reference to FIG. 1. The mixer cartridge contains a housing 1, which is configured for insertion in a sanitary fitting and has a cartridge base 2. On the side facing away from the cartridge base 2, a cartridge lid 3 containing a discharge opening 4 for a shaft 5 of an actuating element 6 is fastened in the housing 1.

In the cartridge housing 1 there is disposed a fixed control plate 7, also referred to as a distributor plate, which can be displaced and twisted relative to a movable control plate 8. For the displacement of the control plate 8, a holding plate 9 is provided. The holding plate has a lug that engages in a correspondingly shaped recess in the control plate 8. The holding plate 9 contains an opening, in which an end 12 of the aforementioned actuating element 6 engages.

The actuating element has in its middle region a ball 13, which is mounted within the valve housing 1. For the mounting, a lower half shell 14 is provided, which together with the cartridge lid 3 forms a ball bearing for the actuating element 6. Between the lower half shell 14 and the housing lid 3 there is provided a circumferential seal 15.

A pivoting of the actuating element about the center point of the bearing of the ball 13 leads to a displacement of the holding plate 9 and hence of the movable control plate 8 of the valve control system. This displacement controls the opening and closing process of the valve.

FIG. 1 shows the holding plate 9 and hence the control plate 8 in the open position of the valve. In this position, that edge of the holding plate 9 which can be seen in FIG. 1 bears against the wall of the housing 1.

If the valve is now closed, then the position represented in FIG. 2 is obtained, in which the holding plate 9 bears on the opposite side against the inner wall of the housing 1. If the actuating element 6 configured as a lever is now pivoted yet somewhat further in the counterclockwise direction, then a portion 16 of the actuating element 6, which portion is of circular cross section and is present directly on the surface of the ball 13, comes to bear against the edge of the opening 4 in the cartridge lid 3. This edge of the opening 4 in the cartridge lid thus forms a stop for the actuating element 6.

Owing to the mounting of the ball portion 13, the actuating element 6 forms a double-armed lever, the stop for the actuating element, which stop is formed by the edge of the opening 4, lies on the side of one lever arm, while the other lever arm engages on the control plate. On sides of the control plate, the holding plate 9 comes to bear against the inner side of the outer wall of the housing 1, which also forms a stop. This stop acts against holding plate 9, and thus also acts as a stop to limit the maximum motion of the control plate 8, which is engaged by holding plate 9.

FIG. 3 now shows a section through the portion 16 on the actuating shaft 5, with a sketched arrangement of the holding plate 9 and of the inner contour 17 of the cartridge housing 1. The holding plate 9 is a circular plate, i.e. has the same cross-sectional shape as the portion 16 of the actuating element 6. The inner contour 17 for the holding plate 9 assigned to the control plate is configured for the most part as a circular arc, which, on the right in FIG. 3, is connected by an angle to a rounded contour 18. The edge 19 of the opening 4 for the actuating element has roughly the same shape, which is arranged, however, in mirror image. The rounded angle is thus disposed on the left, while the arc-shaped part is disposed on the right. In the position of FIG. 3, the holding plate 9 bears directly against the contour 17 of the cartridge housing, while the circular portion 16 of the actuating element still has a minimum distance from the edge of the opening 4.

FIG. 4 shows a same section, this time in the position of FIG. 2, the holding plate 9 for the control plate 8 now likewise bearing against the inner contour 17, to be precise in the position corresponding to the closed position of the valve. Here too, that portion 16 of the actuating element 6 which is of circular cross section lies with minimum distance in front of the corresponding point on the edge of the opening 4, so that, in the event of even just a slight onward motion, a stop enters there into force.

Through the provision of two mutually supporting stops, which are disposed on either side of the fulcrum of the double-armed lever, the forces acting outwardly upon the housing are reduced, with the result that the service life of the valve cartridge, especially its seal-tightness, is increased.

The inner contour 17 of the housing in the region of the holding plate 9 and the inner contour 19 of the opening 4 for the actuating element are chosen such that the maximum motional range of the valve in all directions is enclosed by these lines.

The invention claimed is:

1. A mixer cartridge, comprising:
   a cartridge housing,
   a plate-type control system disposed in the cartridge housing,
   a mounting, disposed in the cartridge housing, for an actuating element of the plate-type control system,
   a stop device for limiting at least a closing motion of the control system and which has a stop for limiting a control plate and a stop for limiting the actuating element,
   wherein the stop for limiting the control plate is configured on an inner contour in the cartridge housing, which contour defines a maximum possible path of motion for at least one of the control plate and an element connected to limit motion of the control plate, and,
   wherein the contour for limiting the actuating element is configured approximately as a reduced mirror image of the contour for limiting at least one of the control plate and an element connected to limit the control plate.

2. The mixer cartridge as claimed in claim 1, wherein the actuating element comprises a double-armed lever and the stop for limiting the actuating element is configured to act upon a lever arm of the double-armed lever that faces away from the control plate.

3. The mixer cartridge as claimed in claim 1, wherein the stop for limiting the actuating element is configured on a contour in the cartridge housing, which contour defines a maximum possible path of motion for the actuating element.

4. The mixer cartridge as claimed in claim 1, wherein the stop for limiting the control plate acts against the control plate.

5. The mixer cartridge as claimed in claim 1, wherein the stop for limiting the control plate acts against an element connected to the control plate.

6. A mixer cartridge, comprising:
   a cartridge housing,
   a plate-type control system disposed in the cartridge housing,
   a mounting, disposed in the cartridge housing, for an actuating element of the plate-type control system,
   a stop device for limiting at least a closing motion of the control system and which has a stop for limiting a control plate and a stop for limiting the actuating element,
   wherein the stop for limiting the actuating element is configured on a contour in the cartridge housing, which contour defines a maximum possible path of motion for the actuating element, and,
   wherein the contour for limiting the actuating element is configured approximately as a reduced mirror image of a contour for limiting at least one of the control plate and an element connected to limit the control plate.

7. The mixer cartridge as claimed in claim 6, wherein the actuating element comprises a double-armed lever and the stop for limiting the actuating element is configured to act upon a lever arm of the double-armed lever that faces away from the control plate.

8. The mixer cartridge as claimed in claim 6, wherein the stop for limiting the control plate is configured on an inner contour in the cartridge housing, which contour defines a maximum possible path of motion for at least one of the control plate and an element connected to limit motion of the control plate.

9. The mixer cartridge as claimed in claim 6, wherein the stop for limiting the control plate acts against the control plate.

10. The mixer cartridge as claimed in claim 6, wherein the stop for limiting the control plate acts against an element connected to the control plate.

* * * * *